Sept. 5, 1933.                    F. SCHÜRMANN                    1,925,408
                                WATERLESS GAS HOLDER
                              Filed April 17, 1929            4 Sheets-Sheet 3
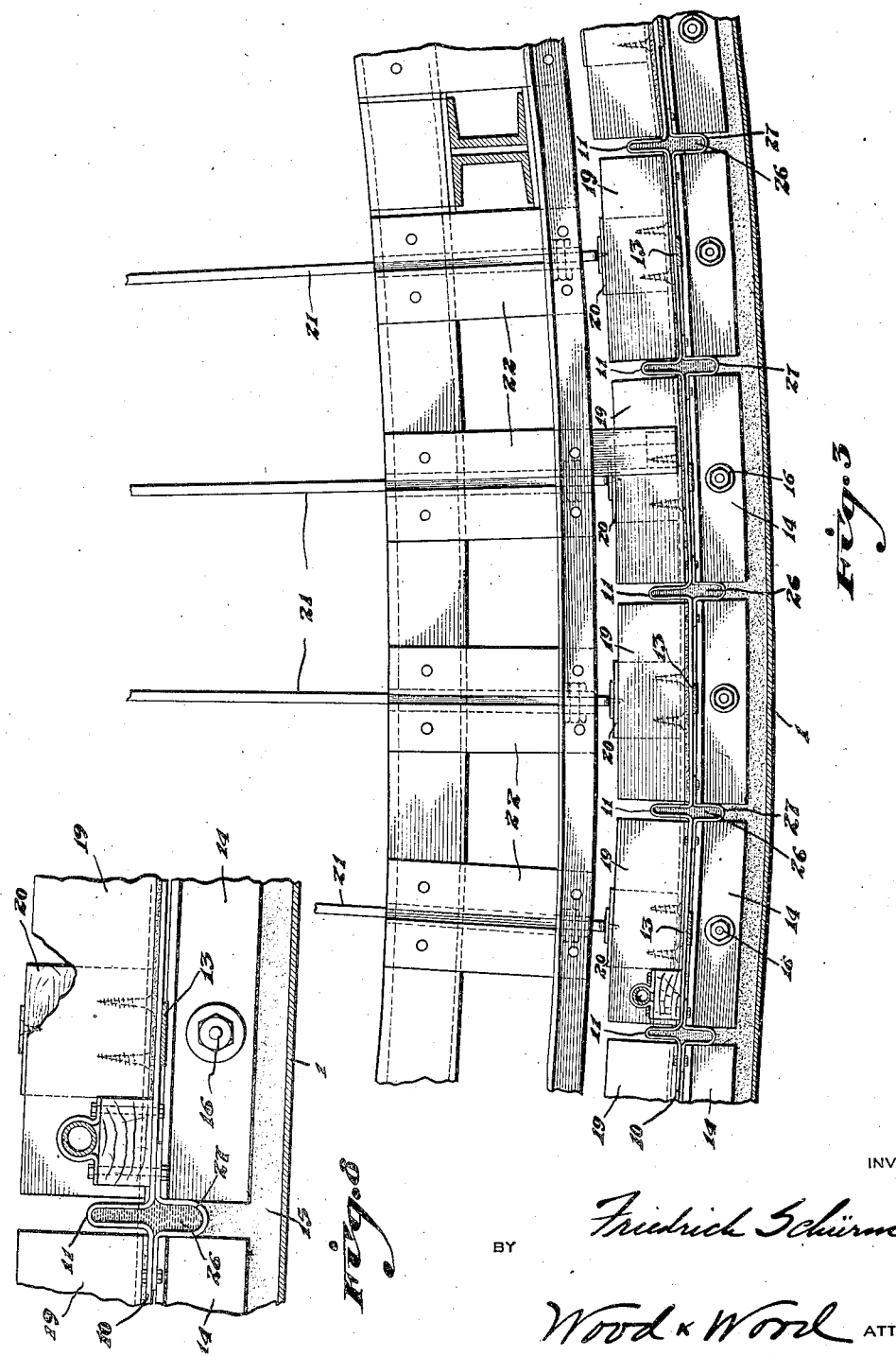
INVENTOR
Friedrich Schürmann
BY
Wood & Wood  ATTORNEYS

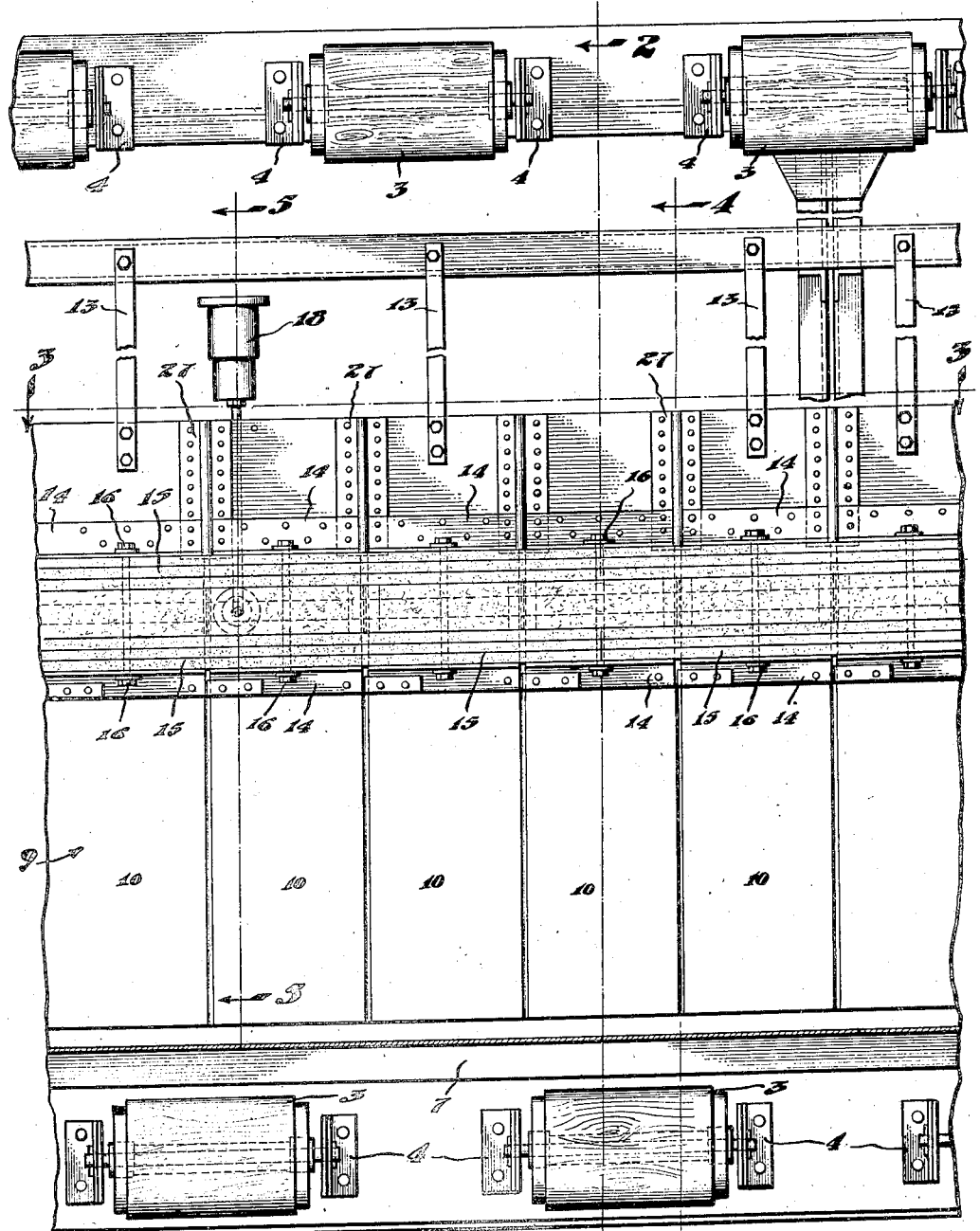

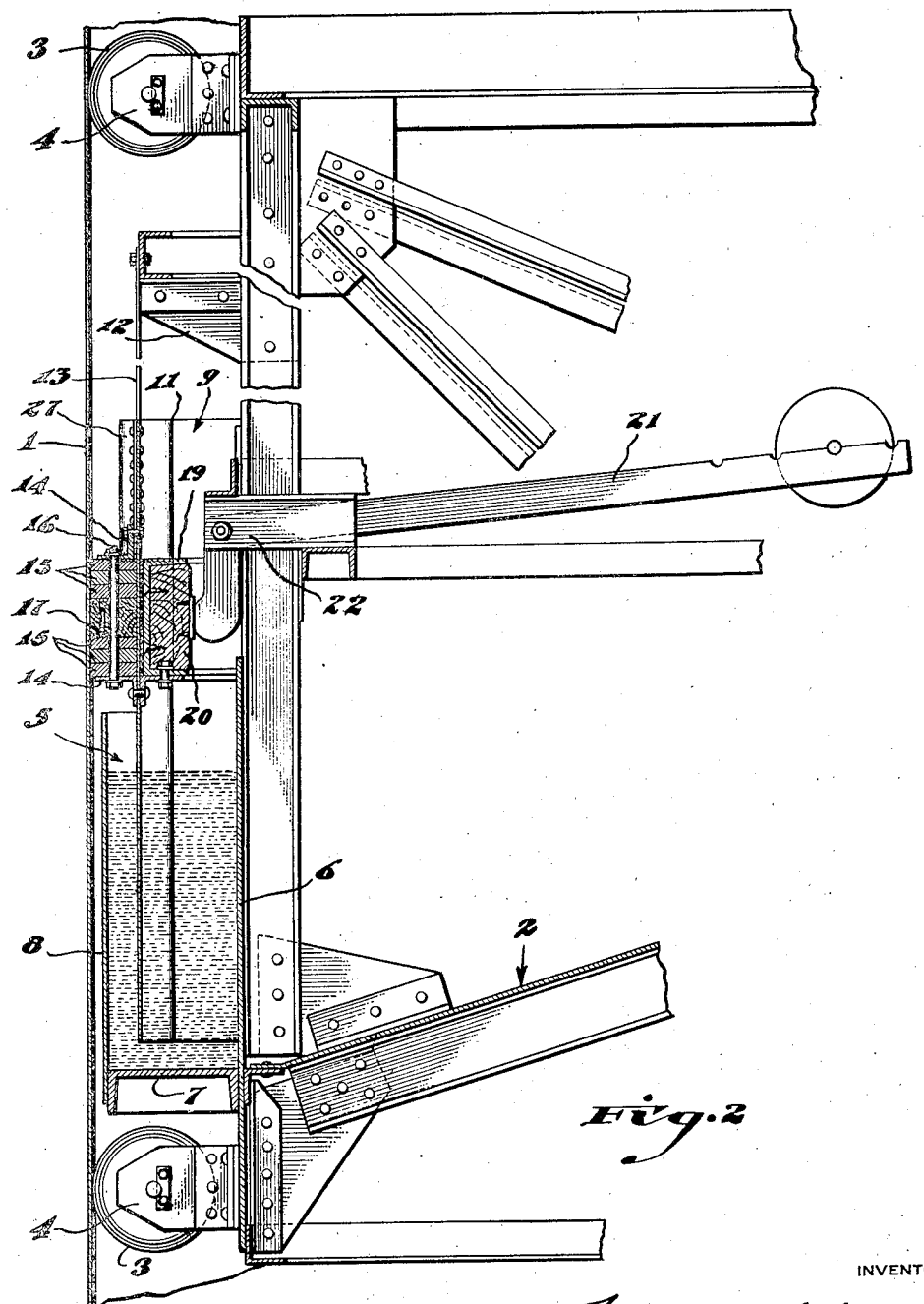

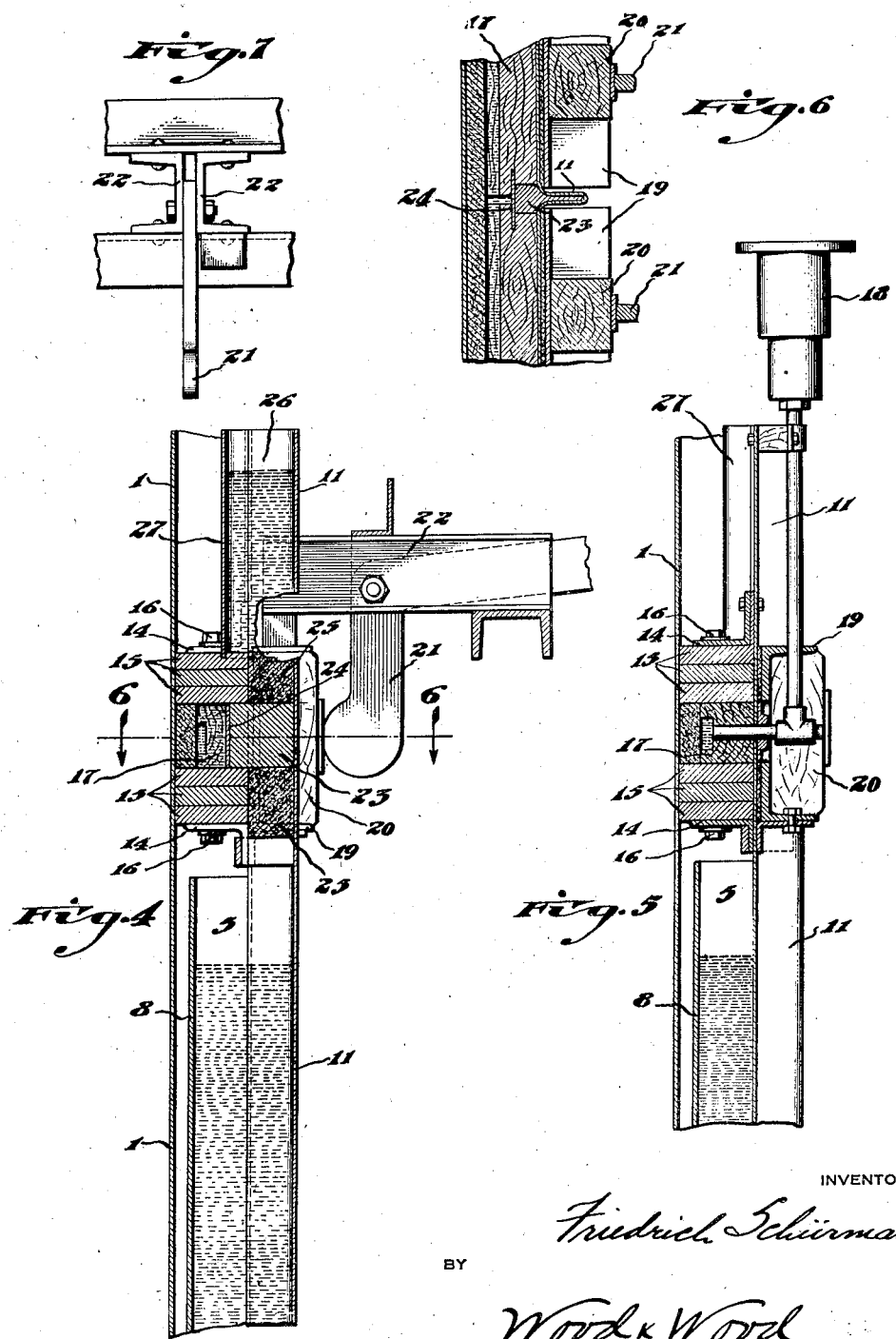

Patented Sept. 5, 1933

1,925,408

UNITED STATES PATENT OFFICE 1,925,408

WATERLESS GAS HOLDER

Friedrich Schürmann, Dortmund, Germany, assignor to firm Aug. Klönne, Dortmund, Germany Application April 17, 1929. Serial No. 355,975

2 Claims. (Cl. 48—176)

This invention relates to storage reservoirs or holders for gas comprising, essentially a cylindrical shell having a floating or vertical translatable piston or deck within the holder as a movable closure therefor. The gas is confined in the space between the piston and the closed base of the holder, and as gas is introduced or exhausted the piston, which, by its weight maintains the gas under pressure, moves up or down. These types of holders are commercially referred to as waterless gas holders.

The present invention consists in improvements in and to the structure of the piston sealing means of the form described and illustrated in prior Letters Patent issued to me November 27, 1928, No. 1,693,468, furnishing a twofold seal for the joint between the periphery of the piston and the interior surface of the wall of the holder, making and maintaining a gas-tight seal and constituting a solid or mechanical, and a liquid seal or trap carried by the piston and moving therewith.

The solid or mechanical seal is representative of an expansible and compressible annular packing, constantly bearing under pressure against the wall of the holder and supported by a flexible and dilatable ring surrounding and linked to the piston, the ring providing a dependable skirt dipping into an annular liquid-holding trough about the piston and with a liquid or fluid in the trough providing a liquid seal or trap between the packing and piston, allowing lateral movement of the piston without disturbing the wall-bearing contact of the packing. The twofold sealing liquid positively prevents any escape of liquid or gas between the piston and the holder.

An object of the invention is to provide a gas holder having a moving closure piston equipped with a mechanical seal or packing, and a liquid seal or trap for the joint between the piston and the wall of the holder, producing an efficient gastight seal, accommodating for undue lateral shift and tilt of the piston and uneven surface or contour of a holder erected from commercial sheet plates, welded or riveted together, the mechanical seal having a sliding contact with the holder, bearing thereagainst under pressure and mounted upon an endless dilatable support sustained by the piston, and a liquid trap or seal between the mechanical seal and piston effected by a skirt extension of the dilatable support dipping into an endless liquid containing trough of the piston.

Another object of the invention is to provide a mechanical seal for the joint of the piston and wall of the holder, consisting of packing material compressively engaged against the wall of the holder, with the contacting surfaces of packing and holder lubricated, and in the provision of an annular lubricant holding or feeding duct incorporated in the mechanical seal or packing in conduit connection with lubricant supply holders accessible from the upper side of the piston.

Another object of the invention is to mount a packing for sealing the joint between the piston and holder within sectional packing holders joined by dilatable connections, the packing holders severally depressed toward the wall of the holder, and further to the provision and formation of a lubricant supply pocket in the dilatable connections extending above the elevation of the packing, serving as a liquid seal between the sectional packing holders.

Further objects and features of the invention relate to structural details and arrangements of parts more fully set forth in the description of the accompanying drawings, in which:

Figure 1 is a side elevation of a portion of the piston.

Figure 2 is a section along line 2—2, Figure 1.

Figure 3 is a section along line 3—3, Figure 1.

Figure 4 is a section on line 4—4, Figure 1.

Figure 5 is a section on line 5—5, Figure 1.

Figure 6 is a section on line 6—6, Figure 4.

Figure 7 is a detail end view of the weighted lever for supplying the pressure of one of the levers to force a sectional packing holder for packing against the wall of the holder.

Figure 8 is a detail top plan view of a portion of the packing holding means, particularly at the point flexibly connecting a pair of efficient packing holder sections.

Many efforts have been made to produce an efficient and economical operative commercially designated "waterless gas holder" employing an adjustable or movable disk-shaped closure as a piston within a shell or annular container, rising and descending with the introduction and exhaustion of the gas, or as the volume in the gas holder changes. Owing to the magnitude of the structures, considerable difficulty has been experienced in producing satisfactory dry seals for the joint between the shell or wall of the container and piston.

In a prevailing commercial type, a fluid seal is employed, as tar in a specially designed cup or trough about the circumference of the piston, the wall of the container forming a side of the trough, carried by and movable with the piston. The tar leaks through the space between the piston and wall of the container, continuously trickling and running down along the wall of the container to a collecting trough at the bottom of the container, whence it is returned by automatically electrically controlled gear pumps.

Such system requires considerable inspection, reconditioning of the sealing fluid, and is high in operating expense. The viscosity of the fluid is effected by changes in temperature and becomes diluted so as to require reconditioning.

According to the present invention, a twofold mechanical and liquid seal is provided, preferably in a superposed relation, with the mechanical seal having the characteristics of a packing held under pressure in bearing contact with the wall of the container and moving with the piston, but flexibly connected to the piston and free from any guiding influence to the piston, so as not to have any laterally translatable connection with the piston, thereby adapting the packing to be constantly held in intimate contact with the wall of the container.

The packing is mounted upon a dilatable band or ring supported by flexible straps hanging from a super-frame structure of the piston, the band or ring forming a skirt or apron extending and dipping into an oil holding trough about the circumference of the piston, and therewith form a liquid sealing trap below the packing and between the packing and piston.

An oil, preferably of a consistency which will not congeal in freezing or low temperatures, is confined in the trough. The piston is guidingly sustained by rollers carried by a superframe structure of the piston forming a carriage, and maintains the piston and its circumferential trough free from contact with the wall of the holder to avoid any binding engagement therewith.

The contacting surfaces of the packing and wall of the container are constantly lubricated, reducing frictional resistance to the movement of the piston, and wear of the packing. The lubricant aids in filling up any roughness in either the packing or wall surface of the container through which gas could escape, but its use distinguishes from the fluid seal above referred to, in systems in which a viscous sealing fluid is allowed to leak and trickle down the wall of the container, the lubricant supply in the present instance not having such capacity, nor is the same so required.

Referring to the drawings, the figures of which only show sections or portions of the holder, piston, and other annular parts, it being impossible to clearly illustrate in a single view the complete holder as the parts would be of such reduced scale not clearly legible, it is understood and sufficient from the disclosure herein that the holder or container is essentially a vertical cylindrical shell having a horizontally disposed deck or piston arranged so as to translate vertically in the shell or holder, and thus form a top wall or closure for the holder, the piston provided with a super-structure and rigidly braced by truss beams, without detail reference and disclosure to the particular fabrication of the piston or deck, the same being constructed of structural iron and steel plates under engineering practice to meet the necessities for the different capacities of the holders.

Likewise, the shell or holder may contain exterior bracing necessary for a shell of great height, and the top of the holder is provided with a roof or canopy, all of which is immaterial to the present invention and is, therefore, eliminated from the drawings disclosure.

Referring to the drawings, 1 indicates the wall of the holder which is built up of sheet metal plates welded or riveted together to form a cylindrical structure to provide a container, and 2 the deck or piston forming a movable top closure for the container, the piston being constructed of sheet plates and structural iron beams riveted or welded together to provide a well trussed and rigid structure which will not distort or twist out of shape.

The piston is thus provided with a frame super-structure to which the various parts carried by and moving with the piston are secured and anchored, and also is utilized to provide a carriage for the piston having upper and lower guide rollers 3—3 suitably journalled in bearings 4 fixed to the frame of the piston, the rollers being suitably spaced apart circumferentially and vertically and in rolling contact with the inside surface of the wall of the holder to hold the piston or deck level and against tilting, and freely transport the piston upwardly and downwardly as necessary as the volume of gas within the holder changes.

The piston about its circumference is provided with an annular trough 5 of a substantial depth for holding and confining a supply of liquid, as oil, the trough being formed by a wall 6 forming the circumference of the piston, and the circumference of the piston is formed of curved sheet metal plates welded or riveter together. A curved channel beam 7 is riveted to the wall 6 at the base of the trough, and a vertical wall 8 riveted to the outside flange of the base channel beam 7 forming the outside wall of the trough, the trough being open at its upper ends continuously for a full circumference of the trough, with the outside wall 8 amply spaced from the wall of the holder or container by the rollers, so as to always be free from contact therewith.

The trough is filled with oil to a determined height necessary for the gas pressures within the holder to prevent the oil from being discharged from the trough by the pressure of the gas and destroy the trap or liquid seal for which the oil filled trough is employed.

The liquid, preferably of a low viscous oil within in the trough 5 of the piston, is used to maintain a gas-tight seal or trap between the piston and mechanical or solid seal in a superposed relation to the liquid seal structure. The mechanical or solid seal is in direct bearing contact with the inside surface of the wall or holder of the container, sliding thereon with the vertical movement of the piston, and both seals are utilized to make and maintain a gas-tight joint between the holder and the vertically movable piston, both moving with the piston.

The liquid seal or trap is formed by a dilatable band or ring 9 circumferentially between the piston and wall of the holder, with the lower end of the ring, which may also be referred to as an annular skirt or apron, depending from the mechanical or solid seal, extending or dripping into the circumferential trough 5 of the piston to immerse in the liquid for an appropriate depth.

The ring is free from contact with the opposite walls of the trough to allow for any lateral deflection of the solid seal or dilation of the ring or band, or lateral motion of the piston, without transmittingly connecting said liquid joined parts.

The liquid seal or trap in this capacity, therefore, distinguishes from other types of liquid seals heretofore used, in that its efficiency is not affected by irregularities or variations in the wall of the holder or container, or lateral movements of the piston, nor is it subjected to constant fluctuation, replenishing or reconditioning, as it is approximately stable.

The dilatable band or ring 9 is of corrugated formation, and in the preferred form as illustrated, is composed of a series of curved sheet metal plates 10 welded or riveted together, the plates preferably joined along one of the corrugations, and each sheet is provided with definitely spaced vertical corrugations 11 symmetrically arranged for the circumference of the ring. The corrugations allow the ring to dilate or retract, and bend to any irregular contour necessitated or imposed thereon for maintaining and bringing the mechanical seal or packing mounted upon the ring in full bearing contact with the wall of the holder and throughout the entire inner circumference thereof.

The dilatable ring is suspended from brackets 12 fixed to the super-frame structure of the piston by vertical flexible band metal straps 13 each fixed to the bracket at one end and to the dilatable ring at the opposite end, the straps being suitably spaced apart and symmetrically arranged for the circumference of the ring.

Between each pair of corrugations of the dilatable ring, sections of angle iron 14—14, relatively opposing and spaced, are fixed to the ring providing sectional holders for the packing material 15 arranged in superposed layers, bolted as a unit to the angle iron holders by bolts 16. The packing may constitute various types of pliable packing material, such as fabric reinforced rubber.

In the particular arrangement shown, the packing is arranged in upper and lower units, separated by a wood spacing block 17 slightly set back from the outer, wall contacting edge of the packing to form with the packing an annular groove or duct for a suitable lubricant, as for instance, a compound of glycerine and graphite, supplied to the groove by lubricant holding cups 18 in pipe or conduit connection with the trough as shown in Figure 5, a series of these lubricant supply connections being made, depending upon the lubricant capacity required for a given diameter holder, the piping connection being made or extended through the wood packing spacing block 17.

In this connection various grades and kinds of lubricant may be employed, as a tar grease, or tar oil, variants in lubricant being required in cases of purified and unpurified gas, with no effort herein made to specify a particular kind of lubricant.

A channel plate 19, one for each packing holder section, is fixed to the inner side of the ring 9 in rear of the holder section and between a pair of corrugations of the ring 9, and centrally thereof carries a metal faced wood bearing block 20 against which a rounded end of a weighted bell crank lever 21 bears for applying a bearing pressure upon the ring and the packing to compressively contact the packing against the wall of the holder. The lever is suitably mounted and pivoted to a bracket 22 of the super-frame structure of the piston, its free or extended end carrying a weight which can be adjustably moved thereon for varying the pressure.

In the organization as shown, a bearing block 20, for each of the spacings between the corrugations of the ring 9, each having its individual weighted lever or pressure device, is employed so that the packing compressing force is applied to the packing at a multiplicity of points for the circumference of the packing. This efficiently brings the packing into intimate contact fully and completely with the inner surface of the container wall, and under any degree of deflection necessary to accommodate for any irregularity in the circumferential surface of the wall to seal against escape of gas between the packing and container wall.

The spacing distance of the corrugations, considering the large circumference of the ring, is comparatively close, allowing for considerable dilation which accordingly also multiplies the number of pressure-influenced packing holder sections, preventing any buckling or twisting of the packing which would provide an opening for the escape of gas.

To safeguard against possible leakage of gas from the rear side of the packing between the ends of the holder sections, an elastic plug 23 (see Figures 4 and 6) is inserted between the opposing ends of a pair of the intermediate packing spacing blocks, the plug being of a shape to compressively fit into the corrugation of the ring 9 and furnish a greater width base portion, seating against a cross plate 24 morticed into the opposing ends of adjacent spacing blocks 17, thus confining the plug against lateral displacement.

Felt packing 25—25 is interposed in the groove portion of the corrugation, above and below the elastic plug 23 and between the inner edges of the packing and head portion of the corrugation, saturated with oil, particularly the upper packing which is exposed to an oil or liquid holding pocket 26 formed by closing the outer or groove side of the corrugation of the ring, by a flexible metallic U clip 27 fixed to the ring.

As shown in Figure 8, the corrugation of the clip extends opposingly to the corrugation of the ring, the ring extending above the packing to an appropriate height to form a definite capacity of oil or liquid holding pocket or cup.

The lower end of the clip is morticed into the upper side of the packing to form a sealing joint therewith, and allows the liquid in the pocket to overlap the rear end of the packing, as shown in Figure 4, providing a liquid seal at the joint or opposing edges of a pair of adjacent packing holder sections. This method is duplicated for each of the corrugations and opposing ends of a pair of packing holder sections for the entire series employed.

The lower felt packing serves to withhold the escape of lubricant from the annular lubricant duct of the packing and against the escape of gas around the rear side of the lower packing unit, so that every safeguard is employed to prevent the escape of gas at the packing.

Having described my invention, I claim:

1. In a waterless gas holder, the combination of a shell, a vertically movable closure piston within the shell, a frame structure fixed to and upwardly from the top side of the piston, carrying upper and lower sets of rollers engaging the inner surface of the shell for guidingly sustaining said piston, a trough surrounding the piston and spaced from the shell, a dilatable ring flexibly suspended from the frame structure of the piston with its lower end depending into the trough, a plurality of straps fixed to the frame structure and dilatable ring for suspendingly sustaining said ring from the frame structure, an annular packing mounted upon and surrounding the dilatable ring and engaging the inner surface of the shell above the trough of the piston, a series of packing holders fixed to the ring for mounting the packing upon the ring and tension means for each holder for compressing the packing into intimate contact with the inner surface of the shell to provide a sealing joint.

2. In a waterless gas holder, the combination of a shell, a vertically movable closure piston within the shell, a frame structure extending upwardly from the piston carrying upper and lower sets of rollers engaging the inner surface of the shell, a trough surrounding the piston and spaced from the shell, a dilatable ring flexibly suspended from the frame structure of the piston constituting a sheet metal band having spaced vertical corrugations, the lower end of the band depending into said trough, a plurality of straps fixed to the frame structure and dilatable ring for suspendingly sustaining said ring from the frame structure, an annular packing mounted upon and surrounding the dilatable ring, and bearing against the inner surface of the shell, a sectional holder fixed to the ring, for mounting the packing, the sections of the holder lying between the corrugations of the band, and tension means for each holder section for compressing the packing into intimate contact with the inner surface of the shell.

FRIEDRICH SCHÜRMANN.